(12) United States Patent
Joseph (10) Patent No.: US 9,158,189 B2
(45) Date of Patent: Oct. 13, 2015

(54) DISPLAY SYSTEM WITH A TRANSPARENT PROJECTION SURFACE WITH REDUCED BLOW-BY

(71) Applicant: DISNEY ENTERPRISES, INC., Burbank, CA (US)

(72) Inventor: Daniel M. Joseph, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 93 days.

(21) Appl. No.: 14/177,475

(22) Filed: Feb. 11, 2014

(65) Prior Publication Data
US 2015/0227035 A1 Aug. 13, 2015

(51) Int. Cl.
G03B 21/14 (2006.01)
G03B 21/604 (2014.01)
G03B 21/62 (2014.01)
G03B 15/03 (2006.01)
G03B 35/24 (2006.01)
G02B 27/28 (2006.01)

(52) U.S. Cl.
CPC .............. *G03B 21/604* (2013.01); *G03B 15/03* (2013.01); *G03B 21/14* (2013.01); *G03B 21/62* (2013.01); *G03B 35/24* (2013.01); *G02B 27/28* (2013.01)

(58) Field of Classification Search
CPC ........... H04N 13/0409; H04N 13/0411; G02B 27/225; G03B 21/62; G03B 35/24
USPC ................. 353/7–8, 20, 22, 74, 79, 119, 121; 348/743–747; 349/5, 7–9
See application file for complete search history.

(56) References Cited

U.S. PATENT DOCUMENTS

| 5,469,295 | A  | * | 11/1995 | Burke ........................... 359/478 |
| 7,182,467 | B2 | * | 2/2007  | Liu et al. ......................... 353/79 |
| 8,690,335 | B2 | * | 4/2014  | Okumura et al. ................. 353/8 |
| 8,794,764 | B2 | * | 8/2014  | Schuck et al. ..................... 353/7 |
| 2003/0214632 | A1 | * | 11/2003 | Ma et al. ......................... 353/31 |
| 2004/0105076 | A1 | * | 6/2004 | Huber ............................. 353/20 |

* cited by examiner

*Primary Examiner* — Sultan Chowdhury
(74) *Attorney, Agent, or Firm* — Marsh Fischmann & Breyfogle LLP; Kent A. Lembke (57) ABSTRACT

A display system that is adapted to provide control blow-by. The display system includes a projector that is operable to project light through a lens. The system also includes a first polarizer positioned proximate to the lens receiving and first polarizing the projected light. The display system further includes a projection screen assembly that includes a transparent projection screen and a second polarizer. The projected light first strikes the transparent projection screen causing a projected image to be displayed. The second polarizer is adapted to second polarize the projected light to provide cross-polarization and reduce blow-by in the display system. The first and second polarizers are configured with first and second axes of polarization, and the first and second polarizers are arranged in the display system with the first axis of polarization substantially orthogonal to the second axis of polarization to provide full cross-polarization of the projected light.

36 Claims, 6 Drawing Sheets

DISPLAY SYSTEM WITH A TRANSPARENT PROJECTION SURFACE WITH REDUCED BLOW-BY

BACKGROUND

1. Field of the Description

The present invention relates, in general, to display systems and devices for providing unique imagery and effects, and, more particularly, to displays (or display assemblies/systems) and display methods that are adapted to provide the illusion of a transparent interface or monitor or even a non-existent interface screen (e.g., imagery appears to be provided in mid-air).

2. Relevant Background

There are numerous settings where it is desirable to create a unique visual display. For example, theme or amusement parks may include rides or walk-through attractions where guests (or "viewers") are entertained by a unique visual effect or illusion. For example, recently a number of science fiction movies have been released in which convention physical computer monitors are replaced by computer interfaces or "screens" that are provided in space or mid-air in front of the computer or communication device user. In many other cases, the monitor or screen is shown to be a sheet of material that is transparent to the viewer such that displayed imagery is translucent and a viewer can see objects behind the monitor or screen.

To date, it has proven difficult to design and provide a transparent interface screen or monitor that does not have limitations that ruin or give away the trick or technology behind the display system. For example, a display system may be provided in a space in which viewers can walk on either side or even on all sides of a selected location for a display screen or transparent interface device. In such cases, it is desirable to provide imagery on the display screen or interface without allowing the observers to readily spot the projector or other components that are used to generate imagery.

In some recent displays or entertainment applications, there was a need for displaying characters, information, or other content/imagery so as to imitate the films or interfaces in popular films. The designers attempted to use clear glass, scrims, and holofilm glass as projection surfaces, and a projector was operated to selectively project images onto theses surfaces. While providing useful projection surfaces on one side, these materials or components were not useful for providing a transparent projection screen that can be viewed from two or more sides and not just from the side that is projected upon by the projector.

The large annoyance or "tell" with such projection screens is that the projector shoots light onto their surfaces and all or a majority of the light passes through the projection screen as well as generating a visible image. This is undesirable because it creates "blow-by" or "blow-through" on the other or opposite side. When a scrim is used, for example, the viewer sees the projected imagery on the projector-side of the scrim but also on the floor or wall behind the scrim. As a result, this display system is not useful in a queue or attraction line because the projected light will go right through the display screen and hit the viewers on the back side of the scrim in the face, which will undesirably reveal how the effect is being generated.

There remains a need for improved visual display techniques and systems for providing a transparent display screen or at least the illusion of one. Preferably, such display systems and methods would be adapted to limit, or even eliminate, blow-by so as to better disguise how the effect is being generated. Also, it would be desirable for the display techniques and systems to be relatively inexpensive to implement and to be suited for placement near large crowds (e.g., be non-fragile when bumped and contacted or touched by viewers).

SUMMARY

To address these and other problems with blow-by when using transparent display elements, a display system is presented that controls blow-by. This is achieved through the use of a projection screen assembly that includes a transparent projection screen that may be provided through the use of a printed projection surface provided on a transparent film (or directly upon a polarizer surface). The printed projection surface may be a pattern of very small dots (e.g., 600 dots per inch (DPI)) provided in the form of ultra-violet (UV) cured transparent ink as the pattern may be provided on the transparent film (or polarizer) surface through an inkjet printer or similar printing process (e.g., feed the transparent film or polarizer into the printer). Video (or still) image content is provided to the projector, and the projector's light is projected upon the printed projection surface to cause imagery to be displayed on the transparent projection screen.

Significantly, the screen would be transparent (e.g., water clear transparent) without additional components in the display system that both allow the back side of the transparent projection screen to be visible by viewers (as viewers may be on either side of the projection screen) and also act as a light valve to block nearly all blow-by (e.g., 50 to 100 percent of the light with 80 to 95 being common blockage of light from the projector). Specifically, a first piece of polarizing material (first polarizer or first polarization element) is placed over the projector's lens (anywhere between the projector and the printed projection surface) to first polarize the light. Then, a second piece of polarizing material such as a polarizer sheet or film (second polarizer or second polarization element) is placed behind the printed projection surface (e.g., abutting the printed projection surface or the film upon which this is printed and between the projection surface and a viewing space).

The second polarizer is oriented relative to the first polarizer so as to provide partial or full cross-polarization of the light, e.g., the light passing through the transparent projection screen is second polarized so as to partially or fully block the light from the projector (e.g., reduce to 10 to 20 percent blow-by which may be negligible and not noticed by viewers). When the transparent projection screen is viewed from the side with the second polarizer (or through the second polarizer), however, the second polarizer appears water clear or transparent so that the projected image on printed projection surface is visible to the viewer while concurrently another viewer on the projector side of the printed projection surface can also view the same projected image (and also see the other viewer when they are across from each other).

Briefly, when a polarizing material is put on or over a projector and the projector is pointed at the special screen material including a backing layer of polarizing material (e.g., one arranged with its polarization axis orthogonal to the projector's polarizing material in the case of linear polarized material), an image appears on the screen material while nothing (or no or little light) leaks through onto the objects or people behind the screen material.

More particularly, a display system is provided that is adapted to control blow-by while providing a transparent interface effect. The display system includes a projector that is operable, based upon input content defining one or more images, to project light through a lens. The system also includes a first polarizer positioned proximate to the lens receiving and first polarizing the projected light. The display system further includes a projection screen assembly that includes a transparent projection screen and a second polarizer. In this screen assembly, the projected light first strikes the transparent projection screen causing a projected image to be displayed. Significantly, the second polarizer is adapted to second polarize the projected light to provide cross-polarization and reduce blow-by in the display system. In some embodiments, the first and second polarizers are configured with first and second axes of polarization, and the first and second polarizers are arranged in the display system with the first axis of polarization substantially orthogonal to the second axis of polarization (e.g., to provide full cross-polarization of the projected light).

In some cases, the second polarizer is substantially transparent to non-polarized light, whereby the projection screen assembly is substantially transparent when illuminated with ambient light. In the same or other cases, the transparent projection screen includes a scrim, but, in many other implementations, the transparent projection screen includes a printed projection surface printed upon the second polarizer or upon a sheet of transparent material positioned adjacent to the second polarizer.

In these latter embodiments, the printed projection surface includes a plurality of dots formed of transparent ink. For example, the transparent ink may take the form of UV-curable transparent inkjet ink, and the dots are printed using an inkjet printer. The dots of the printed projection surface can be provided at a density in a range of 500 to 700 DPI (or at a density of 10 to 30 percent of the surface being covered with the ink). In yet other embodiments, the display system may further include a camera with a flash element, and the flash element may include a polarizing element adapted, when combined with the second polarizer, to provide cross-polarization of light emitted from the flash element (which prevents the display from being washed out during flash photography).

BRIEF DESCRIPTION OF THE DRAWINGS

FIG. 1 illustrates a functional block diagram of a display system with a transparent projection screen showing components useful for reducing or nearly eliminating blow-by;

DETAILED DESCRIPTION

Briefly, a display system is described herein that is specially adapted to control blow-by when a transparent projection screen is utilized to display images to viewers on both or all sides of the screen. This is achieved by providing a printed projection surface on a transparent film (or directly on a second polarizer) to display projected images while allowing the screen to be translucent to nearly completely transparent (e.g., without the projected light, the screen appear transparent). Next, the projector is modified to include a first polarizer or polarizing film such that the light used to project the image onto the printed projection surface has a first polarization. Then, a second polarizer or polarizing film is placed opposite the printed projection surface, and the second polarizer is aligned or arranged so as to partially or, more preferably, fully cross-polarize the projected light so as to partially or nearly fully (e.g., 85 to 100 percent) block the projected light from passing through the second polarizer. In this way, viewers may observe the projected image from either side of the printed projection surface without blow-by ruining the illusion of a transparent display device or interface.

Figure 1:
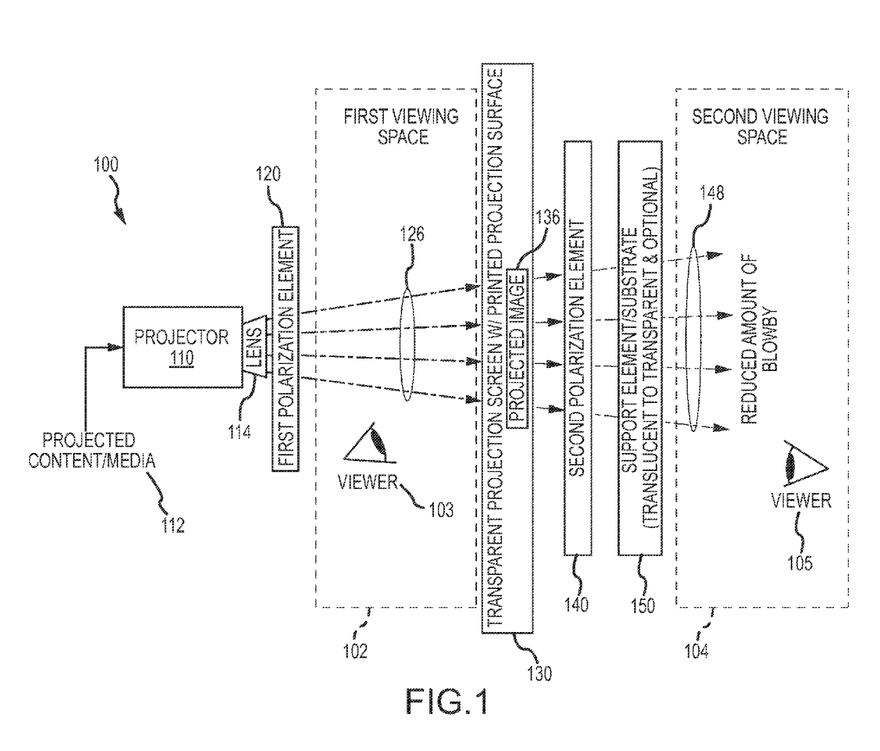

FIG. 1 illustrates a functional block diagram of a display system with a transparent projection screen showing components useful for reducing or nearly eliminating blow-by. The display system 100 includes a projector 110 with a lens 114, and content or media (e.g., video or still images) 112 is input into the projector 110 to operate the projector 110 to project light 126 based on such content 112. The content or media 112 is generally not limiting to the present system 100, but it may be chosen to emphasize the effect of a transparent screen/interface such as by including an image of a person communicating to viewers surrounded by one or more spaced apart data/display sections. By choosing to space apart different content, the dividing "blank" spaces appear transparent to viewers 103, 105, which furthers the transparent interface effect rather than providing the common appearance of projected imagery.

A goal of the display system 100 is to provide projected image 136 that is visible concurrently to viewers 103 in a first viewing space 102 on a front or first side (projector side) of the transparent projection screen 130 and to viewers 105 in a second viewing space 104 on a second or back side (opposite the projector) of the transparent projection screen 130. Further, it is desirable that any blow-by or light 148 from the projector 110 passing through the screen 130 be reduced or nearly eliminated (e.g., reduce light 126 to about 10 to 20 percent of its original brightness).

To this end, the display system 100 includes a transparent projection screen 130 that includes a printed projection screen (explained in greater detail below) that is configured to be transparent in ambient light but to display the projected image 136 in response to being struck by or receiving projected light 126 from the projector 110. A light valve is achieved by providing first and second polarization elements 120, 140 (or first and second polarizers or polarizing films/sheets) that are aligned relative to each other to provide full (or at least partial 50 to 90 percent or more) cross-polarization of the light output from the projector 110 via lens 114. The polarization elements may be configured with linear or circular polarization. In the case of linearly polarized elements 120, 140, the axes of polarization of the elements 120, 140 may be arranged to be orthogonal so as to provide cross-polarization and block the light from traveling past the second polarization element 140 to the viewer 105 or the second viewing space 104.

As shown, the first polarization element 120 is placed near or over the lens 114 so as to first polarize all of the light 126 output from the projector 110 in a first manner. The second polarization element 140 is positioned in the display system 100 between the transparent projection screen 130 and the second viewing space 104. Often the transparent projection screen 130 will be in abutting contact or even laminated or attached to the second polarization element 140 in the display system 100. Again, the two elements 120, 140 are arranged so as to provide cross-polarization (full or partial such as by aligning their polarization axes at 90 to 45 degrees (or less in some cases where some blow-by is desired or useful to achieve a particular effect)). In some prototype embodiments, linear polarizers distributed by Rosco (of the United States) were used for elements 120, 140 (e.g., one f-stop Rosco linear polarizers) as this material is available in large, thin sheets that can be cut to desired sizes for the elements 120, 140.

The display system 100 may also include an optional support element or substrate 150 for providing physical support of the screen 130 and polarizer 140, which may be formed of thin films of flexible and transparent materials. Note, the second polarizer 140 is transparent to light that has not passed through the first polarization element so that it appears transparent to viewers 103, 105 in spaces 102, 104 and also allows the viewer 105 in second viewing space 104 to observe the projected image 136 on the printed projection surface of transparent projection screen 130. The support element or substrate 150 may be formed of transparent (or at least translucent) glass, plastic, or other materials, and, often, it may be thicker so as to provide adequate physical strength to a relatively large display screen 130, e.g., the screen 130 may be similar in size to many existing small to large television or monitor screens/displays.

Figure 2:
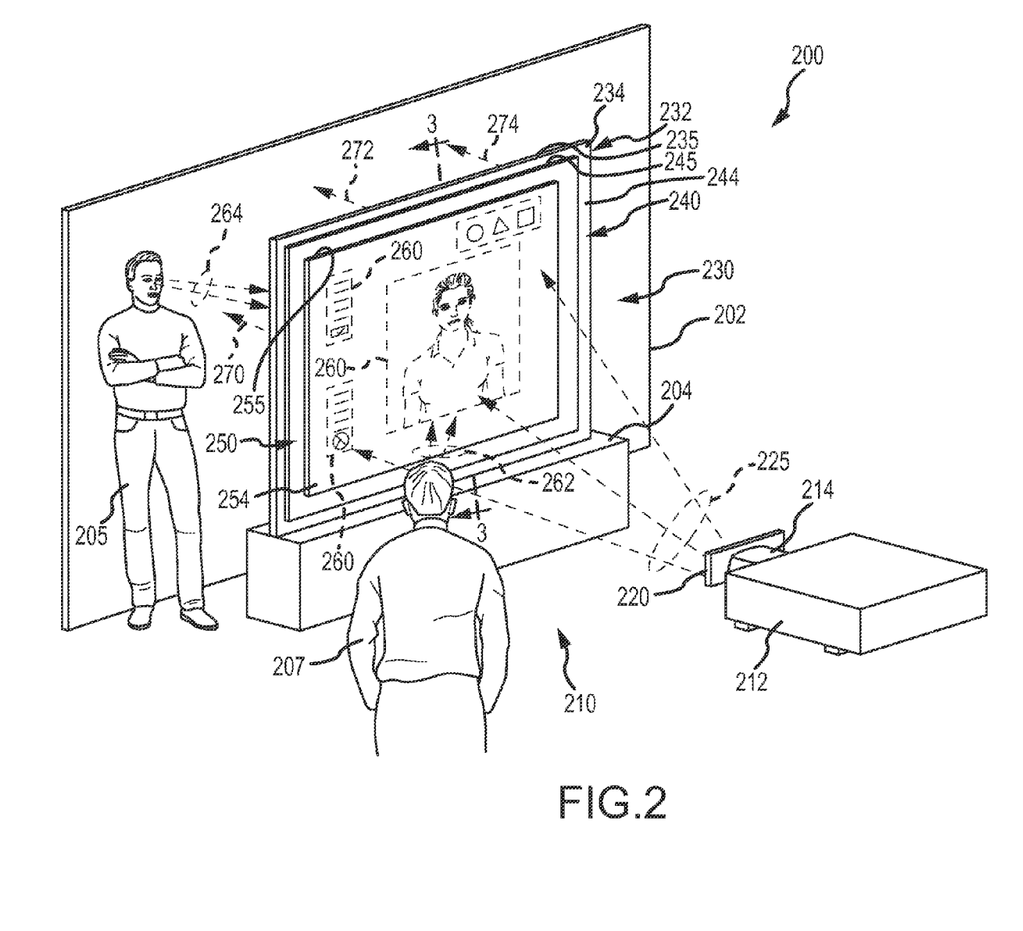
FIG. 2 is a simplified perspective view of a display system during its use within a set or space in which viewers may pass on either side of the projection screen assembly without blow-by from a projector.

FIG. 2 illustrates a perspective view of a display system 210, which may be one useful implementation of the system 100 of FIG. 1. As shown, the display system 210 is placed within a set or display space 200 that includes a backwall or backdrop 202 and a display stand or support 204. Viewing spaces are defined by these components of the system 210 such that one viewer 205 may walk between the stand 204 and the wall 202 while another viewer 207 may walk between the stand 204 and a projector 212. The viewers 205, 207 can concurrently view a projected image 260 on a projection screen assembly 230, which is supported or placed upon the display support/stand 204.

The display system 210 includes a projector 212 with a lens 214, and a first polarizer or polarizing sheet 220 is provided to cover the outlet side of the lens 214 so that the projector 212, when operated with selected content/media, projects light 225 with a first polarization (or polarized with a polarizer with a first alignment or arrangement (e.g., a linear polarizer with its polarization axis horizontal, vertical, or some other position)). The projection screen assembly 230 includes a transparent substrate or support backplane element 232 (e.g., a clear pane of plastic or glass) with a first surface 234 facing the projector 212 and a second surface 235 facing away from the projector 212 (and toward viewer 205 and wall 202).

Upon the surface 234, the assembly 230 further includes a second polarizer or polarizing sheet 240 with a first surface 244 facing the projector 212 and a second surface 245 facing and, typically, abutting and attached to the surface 234 of the support pane 232. The second polarizer 240 is selected to have the same type of polarization (linear or circular) as the first polarizer 220, but it is arranged on the support pane 232 to provide cross-polarization (partial or, more typically, full) of the light output 225 from the projector 212. In the case of use of linear polarized material, the second polarizer 240 may be arranged with its axis of polarization orthogonal (or at 90 degrees) to that of the first polarizer 220. In other cases, partial cross-polarization may be used with the relative alignment of the two polarization axes being between 45 and 90 degrees. In this way, as shown with cross-out arrows 270, 272, 274, there is minimal or reduced blow-by through the assembly 230. For example, full cross-polarization may be used to block about 90 percent of the light 204 from passing through the second polarizer 232. In this way, the viewer 205 observing, as shown with arrows 264, the backside 235 of the support pane 232 will not have a significant amount of light 225 striking their face, which would detract from the illusion or effect provided by display system 210.

To provide a transparent interface effect, the assembly 230 further includes a transparent projection screen 250 with a first surface 254 facing the projector 212 and a second surface or side 255 facing and typically attached to or abutting the surface 244 of the second polarizer 240. The first surface 254 (or back surface 255) will typically include a printed projection surface (e.g., a plurality of dots provided by printing translucent to transparent ink on a film or sheet of transparent material such as an acrylic, a polycarbonate, acetate, or the like and this may be considered a "screen dot print film"). The printed projection surface is generally translucent to transparent in ambient light in the space 200 but, when illuminated with higher brightness projected light 225, the printed projection surface on side 254 (or side 255) acts to display the projected image 260. As shown with the system 210 in use to project light 225, a projected image 260 is displayed on the transparent projection screen 250, and viewers 205 and 207 on opposite sides of the projection screen assembly 230 are able to concurrently view or observe the projected image 260 and without (or with reduced amounts of) blow-by 270, 272, 27 through the assembly 230.

Figure 3:
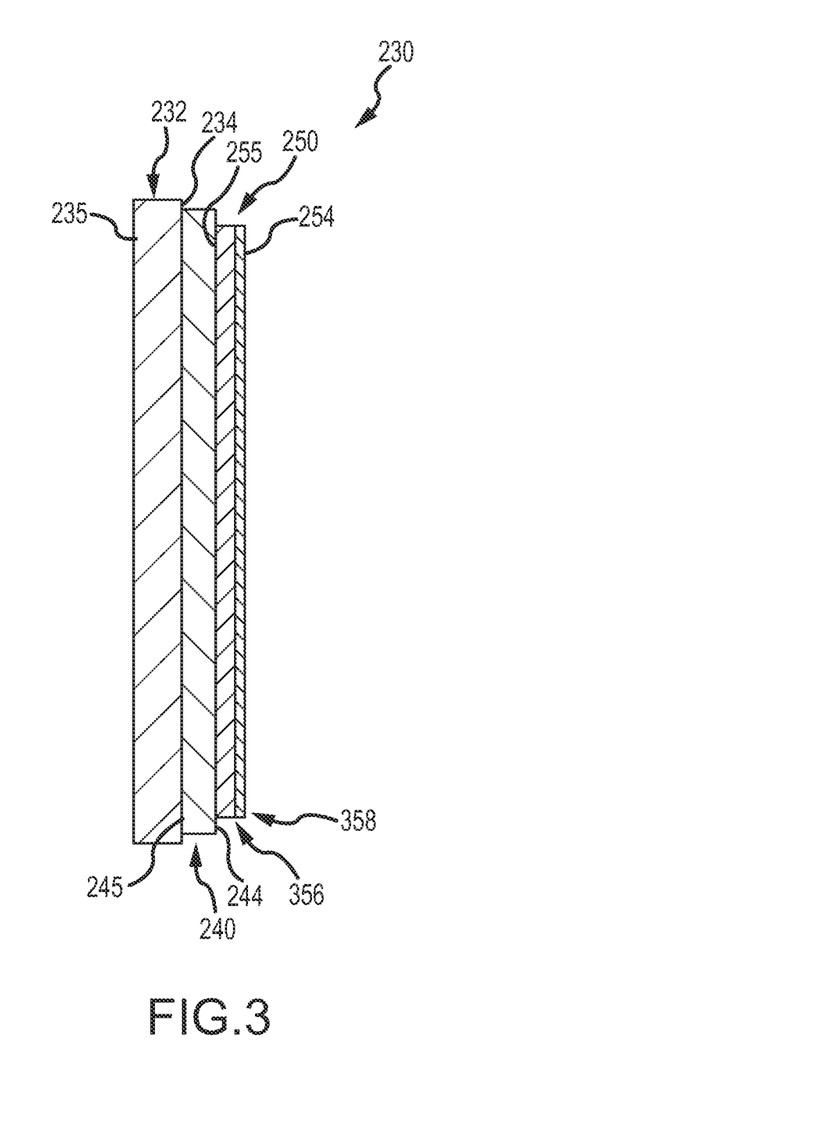
FIG. 3 is a cross-sectional view of the projection screen assembly of FIG. 2 taken at line 3-3.

FIG. 3 illustrates a cross sectional view of the projection screen assembly 230. As shown, the assembly 230 includes a stacking of the transparent support pane 232, the second polarizer 240, and the transparent projection screen 250. The thicknesses of each layer may vary widely to practice the assembly 230, with the pane 232 typically being thickest (e.g., 0.1 to 0.25 inches of plastic or glass) to provide structural strength to the assembly 230. The polarizer 240 and screen 250 may be relatively thin such as less than about 1/16 to 1/32 inches thick or less. Both are formed of material that is relatively clear (or at least translucent) to light such that a projected image may be seen (e.g., through the polarizer 240 via the support pane 232) and the assembly 230 remains relative clear or transparent when no projection is occurring.

The transparent projection screen 250 is provided, in this example, with a thin film or substrate or sheet 356 of transparent material (acrylic, polycarbonate, acetate, or another useful transparent (or at least very translucent) material). Further, the outer or projector-side surface 254 is provided with an ink layer 358 configured to provide a printed projection surface. In some cases, the film 356 is fed into an inkjet printer and a pattern of dots is printed upon one of its sides to provide the printed projection surface in layer 358 (or the layer 358 may be labeled or considered the printed projection surface). The shape of the dots may be circular or another shape, and the density (e.g., size) of the dots may be varied to achieve the printed projection surface of the present invention.

Figure 4:
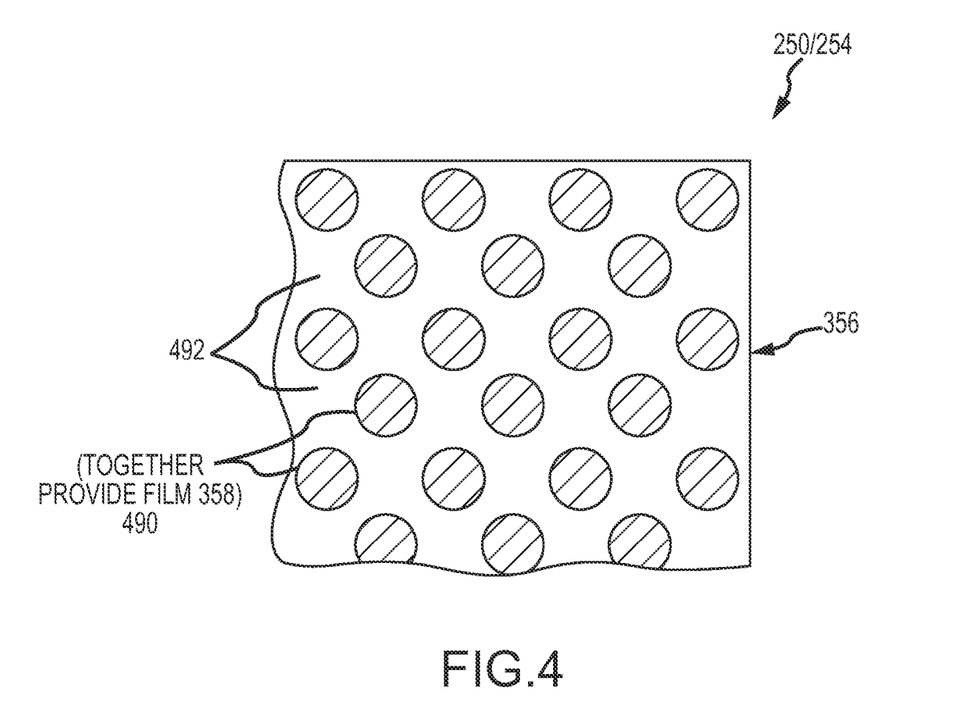
FIG. 4 is an enlarged or detail view of a corner of the transparent projection screen of FIG. 2 showing an exemplary printed projection surface.

In this regard, FIG. 4 illustrates an enlarged view of a small corner or portion of the transparent projection screen 250 as viewed from the projector side 254. This provides a close up view of the thin film/substrate 356 upon which the printed ink layer 358 is provided to achieve a printed projection surface. As shown, the ink layer 358 is made up of a plurality of spaced apart circular dots 490, and the spaces 492 expose the transparent film or substrate 356 (e.g., light can pass directly through the layer 358 in the spaces 492 and onto the second polarizer for cross-polarization).

To achieve a useful printed projection surface 358, the dots 490 are provided at a density in the range of 10 to 30 percent, as densities less than this range are not as useful for showing a quality projected image while densities greater than this may de-polarize the projected light. The ink that is used to provide the dots is chosen to be transparent such as transparent inkjet ink (e.g., UV-cured inkjet ink). The use of transparent ink is useful to hide the existence of the printed projection surface because if different ink is used the screen becomes more apparent to a viewer. The printing may be carried out with nearly any inkjet printer using this ink. The printing may be performed at 400 to 800 DPI, with 500 to 700 DPI being useful, and one implementation prototyped and preferred by the inventor using 600 DPI to provide the dots of the printed projection surface.

Figure 5:
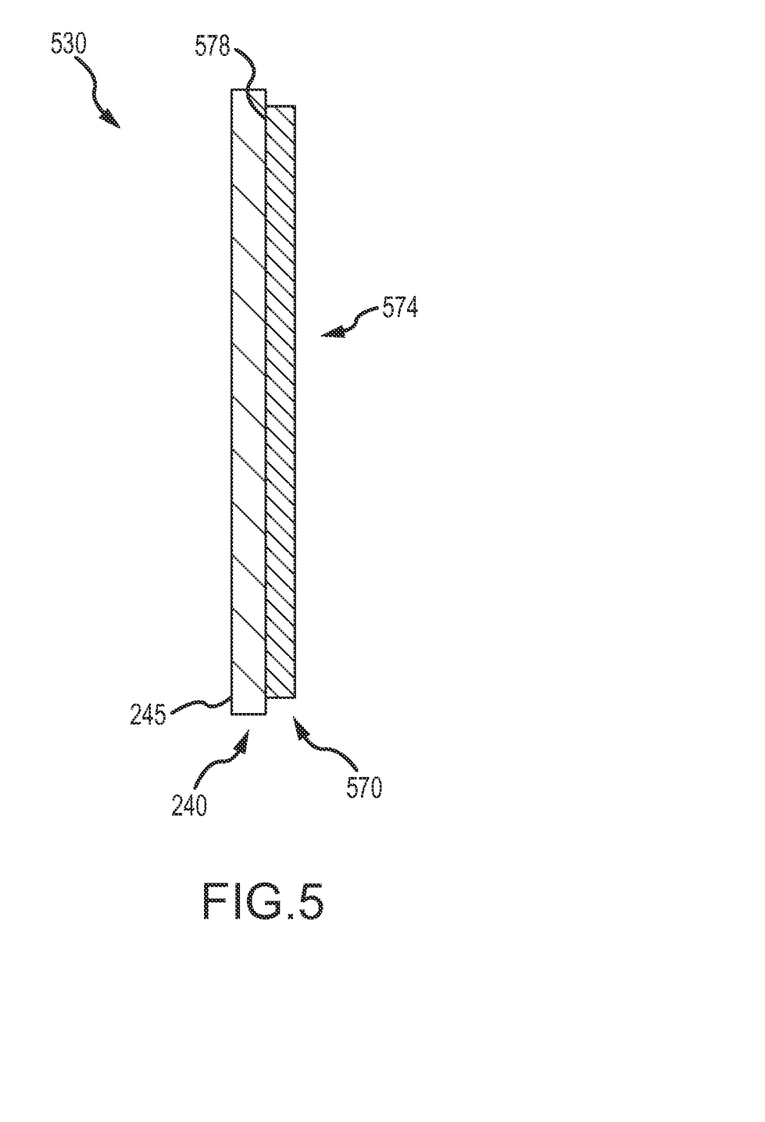
FIG. 5 is another cross-sectional view, similar to that shown in FIG. 3, of another projection screen assembly of the present description in which the projection surface is printed directly onto a polarizer sheet (e.g., a second polarization element as shown in FIGS. 1 and 2)

FIG. 5 illustrates another embodiment of a transparent projection screen 530 that may be used in a display system of the present description such as in place of screen 230 of FIG. 4. In this embodiment, the screen 530 again includes the second polarizer 240, but the screen 530 does not include a separate substrate or film upon which the printed projection surface is printed. Instead, in the screen 530, the second polarizer 240 is itself printed upon to include a layer of ink or a printed projection surface 570, and the surface/side 574 is arranged in a display assembly to be facing a projector (to provide the projector side of the projection screen assembly). To manufacture the screen 530, the polarizer 240 may be fed into an inkjet or other printer, and the printed projection surface 570 (e.g., a plurality of UV-cured transparent inkjet ink dots at about 600 DPI or at a density of 10 to 30 percent) may be deposited or printed directly onto the second polarizer 240.

Figure 6A:
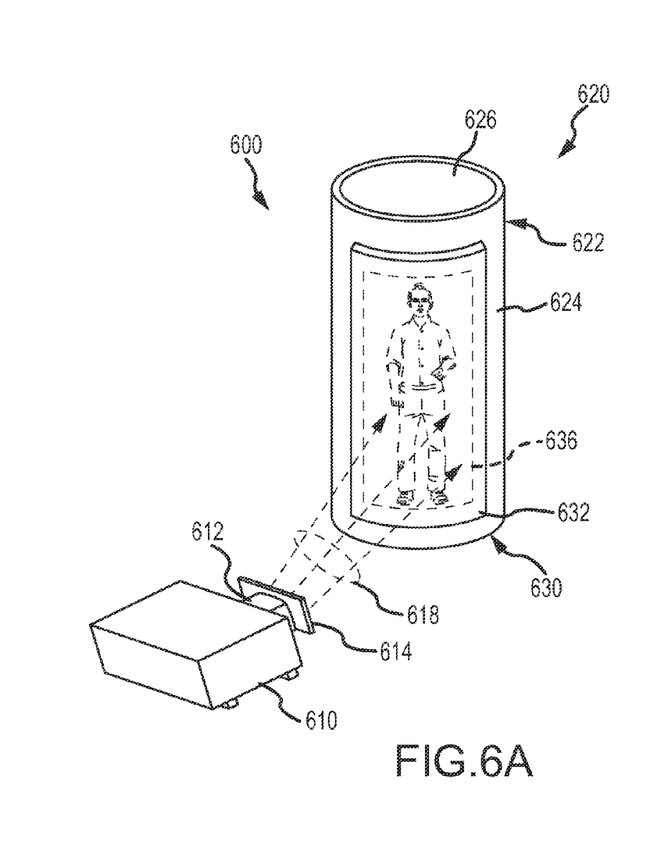
FIGS. 6A and 6B show a perspective view and a top view, respectively, of a display system that uses a semi-circular transparent projection screen, which illustrates the screen may be planar as shown in FIG. 2, arched, cylindrical (tubular), or other cross sectional shapes to practice the concepts described herein.
Figure 6B:
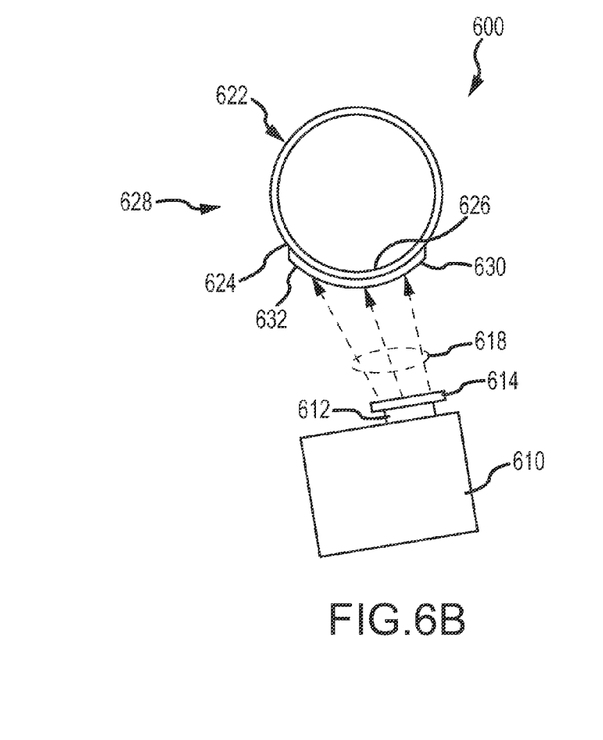

The above examples show display systems in which the printed projection surface is provided on a transparent film or support element that is planar. It should be understood, though, that the printed projection surface and the second polarizer may have many other cross sectional shapes such as an arched or arcuate shape, a semi-circular shape, a wavy shape, and the like. In this regard, FIGS. 6A and 6B illustrate a display system 600 with a perspective view and a top view that utilizes a cylindrical support pane or substrate 622 such that the transparent projection screen 630 is arched or has a semi-circular cross sectional shape rather than a planar shape.

As shown, the display system 600 includes a projector 610 with a lens 612 covered by a first polarizer 614, and the projector 610 is selectively operated (with still or video content/media as discussed above) to project light 618 toward a projection screen assembly 620. The light 618 has, as a result, a first polarization (e.g., after passing through a linear or circular polarized material with a first alignment).

The projection screen assembly 620 includes a transparent support pane or substrate 622 with a cylindrical shape (full as shown or could be a partial cylinder) and with an inner surface 626 defining an interior volume (in which a 3D prop may be positioned to achieve a desired display/effect). The support pane/substrate 622 also has an exterior surface 624, and a portion or region of this surface 624 faces the projector 610 to receive the projected light 618. The assembly 620 further includes a transparent projection screen 630 that is affixed to the exterior surface 624 in the region facing the projector 610 such that the light 618 strikes this screen 630. The screen 630 is transparent such that ambient light passes into the interior space defined by the inner surface 626 and the light 618 would too if not for the use of the light valve concept taught herein.

Specifically, the transparent projection screen 630 may take the form shown in FIG. 3 or FIG. 5 and is adapted to provide a printed projection surface 632 on the projector side of the screen 630. Hence, a projected image 636 is displayed on the screen 630 and is visible both from the projector side of the projection screen assembly 620 and also through the back wall and in the interior space of the cylindrical support pane/substrate 622. To this end, the printed projection surface 632 may be printed upon a second polarizer provided in the transparent projection screen or upon a transparent film that is attached to the second polarizer (e.g., the second polarizer may be sandwiched between the transparent projection screen 630 and the outer surface 624 of the support pane/substrate 622). The second polarizer, as discussed above, would be arranged to provide at least some amount of cross-polarization to reduce blow-by through the transparent support pane/substrate 622, e.g., by having its axis of polarization be 45 to 90 degrees offset from that of the axis of polarization of the first polarizer 614 when linearly polarized material is used for the two polarizers.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

In one prototype, the inventor used circularly polarized films for the two polarizers, and these two were aligned relative to each other to achieve full cross-polarization. In this way, the blow-by was reduced from a range of 90 to nearly 100 percent blow-by to only 10 percent blow-by, which resulted in a nearly imperceptible amount of light in the space behind the second polarizer and the nearby printed projection surface. The display systems of the present description may be thought of as being configured to provide cross-polarization blow-by control.

A thin film of acrylic was fed into an inkjet printer to provide a screen dot print film or a transparent film/substrate with a printed projection surface on one of its sides/surfaces. The ink used was UV-cured transparent inkjet ink, and the dots for the projection surface/pattern were provided at 600 DPI, but it is likely that 500 to 700 DPI will also be highly useful print densities. With this transparent ink, the transparent projection screen remains substantially transparent when light is not being projected onto it by a projector (rather than a cloudy, observable patch being present on the transparent substrate at all times).

The inventor recognized, though, that the dot pattern may be printed directly on the second polarized layer or second polarizer, and, in some cases, this may be preferred to avoid having to use an adhesive or other approach for mounting the transparent projection screen onto the second polarizer. In such embodiments, the printed projection surface and the transparent projection screen may be thought of as the same component or as both being provided with a layer of printed ink. The transparent projection screen may be planar or arched, cylindrical, or other shape as was verified with several prototypes implemented by the inventor.

The particular content or media input into the projector for a projected image may vary widely to implement the display systems and achieve desired effects. In some cases, it may be useful to operate the media/content or projector input so as to over compensate the color gamut to avoid a projected image with an undesirable color due to the use of the first polarizer on the projector. For example, a projected color image may take on a green or other hue when projected through a first polarizer onto the printed projection screen. It may be useful to cause the content to appear too or overly red or another color prior to projection or as fed as input to the projector so as to correct the color or to tune the color of the projected image to a desired color palette.

In some embodiments, the printed projection screen may be replaced with a fabric or theatrical scrim or similar lower density material. The scrim or similar material layer would still be positioned adjacent or near the second polarizer in the projection screen assembly, but the projected image would be visible on the scrim instead of the printed projection surface (i.e., the scrim would provide the transparent projection screen in such display systems). Blow-by through the scrim is controlled as in the other embodiments via cross-polarization of the projected light from the projector through the use of two spaced apart polarizers aligned relative to each other with the axes of polarization orthogonal (or an angle between 45 and 90 degrees to allow greater blow-by).

In other embodiments, the display system further includes a camera for capturing images that include the projected image. For example, a camera may be provided for capturing an image that includes a viewer in front of the projection screen assembly (on either side of the transparent projection screen). In the past, the use of flash photography was problematic with projected imagery as the flash or light from a camera flash element would wash out and ruin the projected image. To avoid this problem, the inventor recognized that the display systems could include cameras with a flash element covered by a sheet of polarized material arranged similarly to that of the first polarizer covering the lens of the projector. In this way, the flash light is cross-polarized by the second polarizer as is the projected light, and the projected imagery is not washed out by the flash light and the projected image remains visible at a higher quality level in the camera-captured image.

I claim:

1. A display system with reduced blow-by, comprising:
a projector operable, based upon input content defining one or more images, to project light through a lens;
a first polarizer positioned proximate to the lens receiving and first polarizing the projected light; and
a projection screen assembly comprising a transparent projection screen and a second polarizer,
wherein the projected light first strikes the transparent projection screen causing a projected image to be displayed and wherein the second polarizer is adapted to second polarize the projected light to provide cross-polarization and reduce blow-by in the display system,
wherein the first and second polarizers are configured with first and second axes of polarization, and
wherein the first and second polarizers are arranged in the display system with the first axis of polarization substantially orthogonal to the second axis of polarization.

2. The display system of claim 1, wherein the second polarizer is substantially transparent to non-polarized light, whereby the projection screen assembly is substantially transparent when illuminated with ambient light.

3. The display system of claim 1, wherein the transparent projection screen comprises a scrim.

4. The display system of claim 1, wherein the transparent projection screen comprises a printed projection surface printed upon the second polarizer or upon a sheet of transparent material positioned adjacent to the second polarizer.

5. The display system of claim 4, wherein the printed projection surface comprises a plurality of dots formed of transparent ink.

6. The display system of claim 5, wherein the transparent ink comprises UV-curable transparent inkjet ink and the dots are printed using an inkjet printer.

7. The display system of claim 5, wherein the dots are in provided at a density in a range of 500 to 700 DPI.

8. The display system of claim 1, further including a camera with a flash element, wherein the flash element includes a polarizing element adapted, when combined with the second polarizer, to provide cross-polarization of light emitted from the flash element.

9. An apparatus for simulating a transparent communication monitor, comprising:
a projector operating to project light to display an image;
a transparent substrate supported a distance away from the projector; and
a printed projection surface on the transparent substrate adapted for displaying the image in response to being illuminated by the projected light,
wherein the printed projection surface comprises a plurality of dots comprising transparent ink that are provided at a density in the range of 10 to 30 percent.

10. The apparatus of claim 9, wherein the transparent ink comprises UV-curable inkjet ink and the dots are printed on a side of the transparent substrate with the use of an inkjet printer operating in the range of 500 to 700 DPI.

11. The apparatus of claim 9, further comprising a first polarizer polarizing the projected light prior to the projected light illuminating the printed projection surface and a second polarize polarizing the projected light after the projected light passes through the printed projection surface.

12. The apparatus of claim 11, wherein the first and second polarizers provide cross-polarization of the projected light to reduce blow-by to the range of 10 to 50 percent of the projected light.

13. The apparatus of claim 11, wherein the first polarizer has a first axis of polarization and the second polarizer has a second axis of polarization that is orthogonal to the first axis of polarization.

14. A display method, comprising:
projecting light to display an image;
first polarizing the projected light;
illuminating a transparent projection screen with the projected light after the first polarizing to display the image; and
second polarizing the projected light after the illuminating of the transparent projection screen so as to provide cross-polarization of the project light, whereby blow-by is reduced during the display method,
wherein the first polarizing comprises passing the projected light through a polarized material with a first axis of polarization and the second polarizing comprises passing the projected light through a polarized material with a second axis of polarization orthogonal to the first axis of polarization.

15. The method of claim 14, wherein the transparent projection screen comprises a scrim or a printed projection surface.

16. The method of claim 15, wherein the printed projection surface comprises a pattern of dots formed of transparent ink provided at a density of at least 10 percent.

17. The method of claim 16, wherein the transparent ink comprises UV-curable transparent inkjet ink printed with a printer onto a sheet of transparent material at a dots per inch (DPI) in the range of 400 to 800 DPI.

18. A display system with reduced blow-by, comprising:
a projector operable, based upon input content defining one or more images, to project light through a lens;
a first polarizer positioned proximate to the lens receiving and first polarizing the projected light; and a projection screen assembly comprising a transparent projection screen and a second polarizer,
wherein the projected light first strikes the transparent projection screen causing a projected image to be displayed,
wherein the second polarizer is adapted to second polarize the projected light to provide cross-polarization and reduce blow-by in the display system, and
wherein the second polarizer is substantially transparent to non-polarized light, whereby the projection screen assembly is substantially transparent when illuminated with ambient light.

19. The display system of claim 18, wherein the transparent projection screen comprises a scrim.

20. The display system of claim 18, wherein the transparent projection screen comprises a printed projection surface printed upon the second polarizer or upon a sheet of transparent material positioned adjacent to the second polarizer.

21. The display system of claim 20, wherein the printed projection surface comprises a plurality of dots formed of transparent ink.

22. The display system of claim 21, wherein the transparent ink comprises UV-curable transparent inkjet ink and the dots are printed using an inkjet printer.

23. The display system of claim 21, wherein the dots are in provided at a density in a range of 500 to 700 DPI.

24. The display system of claim 18, further including a camera with a flash element, wherein the flash element includes a polarizing element adapted, when combined with the second polarizer, to provide cross-polarization of light emitted from the flash element.

25. A display system with reduced blow-by, comprising:
a projector operable, based upon input content defining one or more images, to project light through a lens;
a first polarizer positioned proximate to the lens receiving and first polarizing the projected light; and
a projection screen assembly comprising a transparent projection screen and a second polarizer,
wherein the projected light first strikes the transparent projection screen causing a projected image to be displayed,
wherein the second polarizer is adapted to second polarize the projected light to provide cross-polarization and reduce blow-by in the display system, and
wherein the transparent projection screen comprises a printed projection surface printed upon the second polarizer or upon a sheet of transparent material positioned adjacent to the second polarizer.

26. The display system of claim 25, wherein the printed projection surface comprises a plurality of dots formed of transparent ink.

27. The display system of claim 26, wherein the transparent ink comprises UV-curable transparent inkjet ink and the dots are printed using an inkjet printer.

28. The display system of claim 26, wherein the dots are in provided at a density in a range of 500 to 700 DPI.

29. The display system of claim 25, further including a camera with a flash element, wherein the flash element includes a polarizing element adapted, when combined with the second polarizer, to provide cross-polarization of light emitted from the flash element.

30. A display system with reduced blow-by, comprising:
a projector operable, based upon input content defining one or more images, to project light through a lens;
a first polarizer positioned proximate to the lens receiving and first polarizing the projected light;
a projection screen assembly comprising a transparent projection screen and a second polarizer, wherein the projected light first strikes the transparent projection screen causing a projected image to be displayed and wherein the second polarizer is adapted to second polarize the projected light to provide cross-polarization and reduce blow-by in the display system; and
a camera with a flash element, wherein the flash element includes a polarizing element adapted, when combined with the second polarizer, to provide cross-polarization of light emitted from the flash element.

31. An apparatus for simulating a transparent communication monitor, comprising:
a projector operating to project light to display an image;
a transparent substrate supported a distance away from the projector;
a printed projection surface on the transparent substrate adapted for displaying the image in response to being illuminated by the projected light;
a first polarizer polarizing the projected light prior to the projected light illuminating the printed projection surface; and
a second polarize polarizing the projected light after the projected light passes through the printed projection surface.

32. The apparatus of claim 31, wherein the transparent ink comprises UV-curable inkjet ink and the dots are printed on a side of the transparent substrate with the use of an inkjet printer operating in the range of 500 to 700 DPI.

33. The apparatus of claim 31, wherein the first and second polarizers provide cross-polarization of the projected light to reduce blow-by to the range of 10 to 50 percent of the projected light.

34. The apparatus of claim 31, wherein the first polarizer has a first axis of polarization and the second polarizer has a second axis of polarization that is orthogonal to the first axis of polarization.

35. A display method, comprising:
projecting light to display an image;
first polarizing the projected light;
illuminating a transparent projection screen with the projected light after the first polarizing to display the image; and
second polarizing the projected light after the illuminating of the transparent projection screen so as to provide cross-polarization of the project light, whereby blow-by is reduced during the display method,
wherein the transparent projection screen comprises a scrim or a printed projection surface and
wherein the printed projection surface comprises a pattern of dots formed of transparent ink provided at a density of at least 10 percent.

36. The method of claim 35, wherein the transparent ink comprises UV-curable transparent inkjet ink printed with a printer onto a sheet of transparent material at a dots per inch (DPI) in the range of 400 to 800 DPI.

* * * * *